United States Patent
Ike et al.

(10) Patent No.: US 11,932,265 B2
(45) Date of Patent: Mar. 19, 2024

(54) DRIVING ASSISTANCE SYSTEM

(71) Applicant: TOYOTA JIDOSHA KABUSHIKI KAISHA, Toyota (JP)

(72) Inventors: Wataru Ike, Nagoya (JP); Yuma Hoshikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 17/456,357

(22) Filed: Nov. 23, 2021

(65) Prior Publication Data

US 2022/0080984 A1 Mar. 17, 2022

Related U.S. Application Data

(63) Continuation of application No. 16/041,092, filed on Jul. 20, 2018, now Pat. No. 11,214,267.

(30) Foreign Application Priority Data

Aug. 1, 2017 (JP) .................................. 2017-148886

(51) Int. Cl.
*B60W 50/00* (2006.01)
*B60W 30/09* (2012.01)
(Continued)

(52) U.S. Cl.
CPC ........ *B60W 50/0098* (2013.01); *B60W 30/09* (2013.01); *B60W 30/0956* (2013.01);
(Continued)

(58) Field of Classification Search
CPC .. B60W 50/0098; B60W 50/14; B60W 30/08; B60W 30/09; B60W 30/0956;
(Continued)

(56) References Cited

U.S. PATENT DOCUMENTS 9,701,307 B1 7/2017 Newman et al.
2003/0233187 A1 12/2003 Egami
(Continued)

FOREIGN PATENT DOCUMENTS

| CN | 101223048 A | 7/2008 |
|----|-------------|--------|
| CN | 104755344 A | 7/2015 |

(Continued)

OTHER PUBLICATIONS

Notice Of Allowance, United States Patent and Trademark Office, issued to U.S. Appl. No. 16/379,030 dated Feb. 9, 2022, 12 pages.
(Continued)

*Primary Examiner* — Aaron L Troost
(74) *Attorney, Agent, or Firm* — Hunton Andrews Kurth LLP

(57) ABSTRACT

A driving assistance system for a vehicle that includes a target sensor, an operation amount sensor, a speed sensor, and an electronic control unit configured to perform pre-collision control when a predetermined control start condition is satisfied. Also, the pre-collision control is not performed, even when the predetermined control start condition is satisfied, when a permission condition has not been established by a point in time at which the predetermined control start condition is satisfied.

9 Claims, 3 Drawing Sheets

(51) Int. Cl.
  *B60W 30/095* (2012.01)
  *B60W 50/14* (2020.01)
(52) U.S. Cl.
  CPC ......... *B60W 50/14* (2013.01); *B60W 2520/10* (2013.01); *B60W 2540/10* (2013.01); *B60W 2554/00* (2020.02)
(58) Field of Classification Search
  CPC ............... B60W 40/105; B60W 50/12; B60W 2520/10; B60W 2520/14; B60W 2520/28; B60W 2540/10; B60W 2554/00; B60W 2554/80; B60W 2554/4041; B60W 2554/804; B60W 50/13; B60T 7/12
  See application file for complete search history.

(56) References Cited

U.S. PATENT DOCUMENTS

| | | | |
|---|---|---|---|
| 2009/0037055 | A1 | 2/2009 | Danner et al. |
| 2010/0134263 | A1 | 6/2010 | Mathony et al. |
| 2012/0191313 | A1* | 7/2012 | Miyahara ............ B60W 50/087 701/70 |
| 2012/0283895 | A1 | 11/2012 | Noda |
| 2013/0041564 | A1 | 2/2013 | Doi et al. |
| 2013/0173113 | A1* | 7/2013 | Takiguchi ............. B60W 50/10 701/36 |
| 2014/0025267 | A1 | 1/2014 | Tezuka et al. |
| 2015/0046054 | A1 | 2/2015 | Takahashi et al. |
| 2015/0274179 | A1 | 10/2015 | Inoue et al. |
| 2015/0307091 | A1 | 10/2015 | Gokan et al. |
| 2016/0001275 | A1 | 1/2016 | Goto et al. |
| 2016/0194000 | A1 | 7/2016 | Taki et al. |
| 2016/0244036 | A1 | 8/2016 | Ike |
| 2016/0280190 | A1 | 9/2016 | Franz |
| 2017/0106839 | A1 | 4/2017 | Uechi |
| 2017/0197506 | A1* | 7/2017 | Inomata ................ B60W 30/09 |
| 2017/0341612 | A1 | 11/2017 | Ohmori et al. |
| 2018/0043885 | A1* | 2/2018 | Harada ................ B60W 10/06 |
| 2019/0009775 | A1* | 1/2019 | Ito ............................ B60T 7/12 |
| 2019/0092343 | A1 | 3/2019 | Hoshikawa et al. |
| 2019/0315347 | A1 | 10/2019 | Ike |

FOREIGN PATENT DOCUMENTS

| | | |
|---|---|---|
| CN | 106985803 A | 7/2017 |
| DE | 102011121728 A1 | 6/2013 |
| DE | 102013225483 A1 | 6/2015 |
| EP | 2927082 A1 | 10/2015 |
| JP | H11278092 A | 10/1999 |
| JP | 2004017847 A | 1/2004 |
| JP | 2005082041 A | 3/2005 |
| JP | 2008020950 A | 1/2008 |
| JP | 2010282350 A | 12/2010 |
| JP | 2012121534 A | 6/2012 |
| JP | 2012229722 A | 11/2012 |
| JP | 2012234407 A | 11/2012 |
| JP | 2013036434 A | 2/2013 |
| JP | 2013129228 A | 7/2013 |
| JP | 2014093040 A | 5/2014 |
| JP | 2015036270 A | 2/2015 |
| JP | 2015081075 A | 4/2015 |
| JP | 5846316 B2 | 1/2016 |
| JP | 2016078677 A | 5/2016 |
| JP | 5938515 B2 | 6/2016 |
| JP | 5938518 B2 | 6/2016 |
| JP | 2016101891 A | 6/2016 |
| JP | 2017074909 A | 4/2017 |
| JP | 2019182314 A | 10/2019 |
| WO | 2008/007202 A1 | 1/2008 |
| WO | 2014083787 A1 | 6/2014 |
| WO | 2015060453 A2 | 4/2015 |
| WO | 2016059753 A1 | 4/2016 |

OTHER PUBLICATIONS

U.S. Appl. No. 16/379,030 filed with the United States Patent and Trademark Office, filed Apr. 9, 2019, 68 pages.

Non-Final Office Action, United States Patent and Trademark Office, issued to U.S. Appl. No. 16/379,030 dated Mar. 3, 2021, 18 pages.

Extended European Search Report from the European Patent Office issued to EP Application No. 19163853.5 dated Sep. 20, 2019, 8 pages.

Final Office Action, from the United States Patent and Trademark Office, issued to U.S. Appl. No. 16/379,030 dated Aug. 27, 2021, 15 pages.

Non-Final Office Action, United States Patent and Trademark Office, issued to U.S. Appl. No. 16/041,092 dated Apr. 22, 2020, 10 pages.

Non-Final Office Action, United States Patent and Trademark Office, issued to U.S. Appl. No. 16/041,092 dated Aug. 27, 2020, 17 pages.

Notice of Allowance, United States Patent and Trademark Office, issued to U.S. Appl. No. 16/041,092 dated Feb. 8, 2021, 9 pages.

Non-Final Office Action, United States Patent and Trademark Office, issued to U.S. Appl. No. 16/041,092 dated Apr. 14, 2021, 16 pages.

Notice of Allowance, United States Patent and Trademark Office, issued to U.S. Appl. No. 16/041,092 dated Oct. 6, 2021, 9 pages.

* cited by examiner

DRIVING ASSISTANCE SYSTEM

INCORPORATION BY REFERENCE

This is a continuation application of U.S. patent application Ser. No. 16/041,092, filed Jul. 20, 2018, which claims the disclosure of Japanese Patent Application No. 2017-148886 filed on Aug. 1, 2017 including the specification, drawings and abstract is incorporated herein by reference in its entirety.

BACKGROUND

1. Technical Field

The disclosure relates to a driving assistance system.

2. Description of Related Art

A system that performs pre-collision control (e.g., warning, automatic braking, etc.) of a vehicle, when an obstacle that is highly likely to collide with the vehicle is detected, is known (see, for example, Japanese Unexamined Patent Application Publication No. 2012-121534 (JP 2012-121534 A)). The system (which will be called "related system") proposed in JP 2012-121534 A determines that the accelerator operation by the driver is erroneous or wrong operation and perform the pre-collision control, when the depression amount of the accelerator pedal is larger than a threshold value Sa, and the depression speed of the accelerator pedal is greater than a threshold value Va.

SUMMARY

Generally, when a subject vehicle driven by a driver overtakes or passes a forward vehicle, for example, the driver is likely to largely and quickly depress the accelerator pedal. Therefore, when the driver intentionally depresses the accelerator pedal so as to overtake or pass the forward vehicle, for example, the related system is highly likely to recognize the driver's operation on the accelerator pedal, as erroneous operation, and perform pre-collision control. As a result, the related system is highly likely to perform unnecessary pre-collision control when the driver intentionally operates the accelerator pedal. In this case, the driver is highly likely to feel annoyed with the unnecessary pre-collision control.

This disclosure provides a driving assistance system that performs pre-collision control without fail in the event of erroneous operation on the accelerator pedal, while reducing the possibility of performing unnecessary pre-collision control.

A first aspect of the disclosure provides a driving assistance system. The driving assistance system according to the first aspect includes: a target sensor configured to detect target information including a relative position of a target relative to a subject vehicle, the target information including a relative velocity of the target relative to the subject vehicle; an operation amount sensor configured to obtain an accelerating operation amount corresponding to an operation amount of an accelerator pedal of the subject vehicle; a speed sensor configured to detect a vehicle speed, the vehicle speed being a speed of the subject vehicle; and an electronic control unit configured to perform pre-collision control for avoiding a collision with the target, when a predetermined control start condition is satisfied, the predetermined control start condition including an essential condition that both a first condition and a second condition are established, the first condition being that a collision index value satisfies a predetermined index value condition, the collision index value having a correlation with a possibility of collision between the target and the subject vehicle, the collision index value being calculated based on the target information, the second condition being that the accelerating operation amount is equal to or larger than a control threshold value, and not to perform, even when the predetermined control start condition is satisfied, the pre-collision control when a permission condition has not been established by a point in time at which the predetermined control start condition is satisfied, the permission condition being that the accelerating operation amount is equal to or larger than a first operation amount threshold value and the vehicle speed is equal to or less than a speed threshold value.

The inventor found that erroneous pedal depression, which means that "the driver depresses the accelerator pedal by mistake while taking it as the brake pedal", is extremely likely to occur when the subject vehicle is started. Since the subject vehicle is rapidly accelerated when the erroneous depression of the accelerator pedal occurs, the driver tends to further depress the accelerator pedal while mistaking it for the brake pedal. Therefore, when the accelerator pedal is depressed by mistake, the operation amount of the accelerator pedal is extremely likely to be equal to or larger than the first operation amount threshold value when the vehicle speed is equal to or less than the speed threshold value. On the other hand, when the accelerator pedal is intentionally operated by the driver in the case where overtaking, passing, or the like, is conducted, the operation amount of the accelerator pedal is highly likely to be equal to or larger than the first operation amount threshold value, but the vehicle speed at this point in time is extremely likely to be greater than the speed threshold value.

Accordingly, when "the permission condition that the accelerating operation amount corresponding to the operation amount of the accelerator pedal is equal to or larger than the first operation amount threshold value, and the vehicle speed is equal to or less than the speed threshold value" has not been established, by the time when the control start condition is satisfied, the system of the disclosure determines that no erroneous pedal depression occurs, and does not perform pre-collision control that would be implemented under a condition that the accelerating operation amount is equal to or larger than the threshold value for control. Thus, when "the driver's intentional operation of the accelerator pedal, in which the accelerator pedal is likely to be largely depressed", is performed, so as to conduct overtaking, passing, or the like, the possibility of performing unnecessary pre-collision control can be reduced, and the possibility of performing pre-collision control in the event of erroneous operation of the accelerator pedal can be increased.

In the first aspect, when a permission cancellation condition is established, the permission cancellation condition being that the accelerating operation amount becomes smaller than a second operation amount threshold value, the second operation amount threshold value being equal to or smaller than the first operation amount threshold value, the electronic control unit may be configured not to perform the pre-collision control, even when the predetermined control start condition is satisfied and the permission condition is established.

In the first aspect, the electronic control unit may be configured to repeatedly determine, in a predetermined cycle, whether the permission condition is established, and not to perform the pre-collision control, when the permission cancellation condition is established, during a period from a point in time at which the permission condition is established for a first time, to a point in time at which the predetermined control start condition is satisfied.

When the driver notices his/her error in depression of the accelerator pedal, the driver reduces the depression amount (operation amount) of the accelerator pedal, or releases the accelerator pedal; therefore, the accelerating operation amount is highly likely to be reduced to be smaller than the second operation amount threshold value. Accordingly, when the accelerating operation amount becomes smaller than the second operation amount threshold value, it may be considered that the error in pedal depression has been eliminated. Namely, when the permission cancellation condition that the accelerating operation amount is reduced to be smaller than the second operation amount threshold value is established, by the time when the control start condition is satisfied, the accelerating operation at the time when the control start condition is satisfied is considered to be operation according to the driver's intention. With the above configuration, the possibility of performing unnecessary pre-collision control can be reduced.

In the first aspect, the electronic control unit may be configured: to calculate, as the collision index value, a collision possibility correlation value reduced as the possibility of collision between the target and the subject vehicle is increased, each time a predetermined time elapses; to determine that a permission cancellation condition is established, when the collision possibility correlation value calculated at a given point in time is greater than the collision possibility correlation value calculated at a point in time earlier by the predetermined time than the given point in time, in a case where the permission condition is established; and not to perform the pre-collision control when the permission cancellation condition is established, even when the predetermined control start condition is satisfied and the permission condition is established.

In the first aspect, the electronic control unit may be configured to repeatedly determine, in a predetermined cycle, whether the permission condition is established, and not to perform the pre-collision control, when the permission cancellation condition is established, during a period from a point in time at which the permission condition is established for a first time, to a point in time at which the predetermined control start condition is satisfied.

For example, when the vehicle speed is low, the driver may avoid an obstacle located ahead of the vehicle by steering, while intentionally depressing the accelerator pedal by a large degree so as to accelerate the subject vehicle. In this case, since the permission condition may be established, unnecessary pre-collision control may be performed when conditions for pre-collision control are established. However, if the obstacle is avoided by steering, the collision possibility correlation value in the current cycle becomes greater than the collision possibility correlation value in the last cycle. With the above configuration, the possibility of performing unnecessary pre-collision control can be reduced.

In the first aspect, the electronic control unit may be configured to: calculate, as the collision index value, a collision possibility correlation value reduced as the possibility of collision between the target and the subject vehicle is increased, the predetermined index value condition being selected from a plurality of index value conditions, the predetermined control start condition being selected from a plurality of control start conditions, and pre-collision control being selected from a plurality of pre-collision controls; determine that the first condition is established by using a first index value condition as the predetermined index value condition, the first index value condition being one of the plurality of index value conditions, when the collision possibility correlation value becomes equal to or less than a first determination threshold value; and perform control for generating a warning to a driver of the subject vehicle, as one of the plurality of pre-collision controls, when the permission condition has been established by a point in time at which a first control start condition is satisfied, in a case where the first control start condition is satisfied, the first control start condition being one of the plurality of control start conditions, the first control start condition including a condition, as the essential condition, that the first condition is established by using the first index value condition as the predetermined index value condition and the second condition is established.

With the above configuration, the driver can notice the error in depression of the accelerator pedal, and the possibility of performing operation to avoid a collision with the target can be improved.

In the first aspect, the electronic control unit may be configured to: determine that the first condition is established by using a second index value condition as the predetermined index value condition, the second index value condition being one of the plurality of index value conditions, when the collision possibility correlation value becomes equal to or less than a second determination threshold value, the second determination threshold value being less than the first determination threshold value; and perform, as one of the plurality of pre-collision controls, braking control for applying braking force to the subject vehicle so as to decelerate the subject vehicle at a target deceleration calculated based on the target information, when the permission condition has been established by a point in time at which a second control start condition is satisfied, in a case where the second control start condition is satisfied, the second control start condition being one of the plurality of control start conditions, the second control start condition including a condition, as the essential condition, that the first condition is established by using the second index value condition as the predetermined index value condition and the second condition is established.

With this configuration, the possibility of avoiding a collision with the target can be improved, even if the driver does not notice the error in pedal depression.

The second aspect of the disclosure provides a driving assistance system. The driving assistance system includes: a target detector configured to detect a target around a subject vehicle; an operation amount sensor configured to obtain an accelerating operation amount corresponding to an operation amount of a driver of the subject vehicle; a speed sensor configured to detect a vehicle speed, the vehicle speed being a speed of the subject vehicle; and an electronic control unit configured to perform pre-collision control for avoiding a collision with the target, based on the vehicle speed at a point in time at which the accelerating operation amount becomes equal to or larger than a first operation amount threshold value.

With the above configuration, it is possible to reduce the possibility of performing unnecessary pre-collision control at the time of the driver's intentional operation in the operation amount corresponding to the accelerating operation amount, and increase the possibility of performing pre-collision control at the time of erroneous operation by the driver in the operation amount.

In the second aspect, the electronic control unit may be configured to perform the pre-collision control, when the vehicle speed at the point in time at which the accelerating operation amount becomes equal to or larger than the first operation amount threshold value is equal to or less than a speed threshold value, and a possibility of collision between the target and the subject vehicle is determined to be higher than a collision threshold value; and not to perform the pre-collision control even when the possibility of collision between the target and the subject vehicle is determined to be higher than the collision threshold value, in a case where the vehicle speed at the point in time at which the accelerating operation amount becomes equal to or larger than the first operation amount threshold value is greater than the speed threshold value.

With this configuration, at the time of the driver's intentional operation in the operation amount corresponding to the accelerating operation amount, the possibility of performing unnecessary pre-collision control can be reduced. Further, with the above configuration, at the time of erroneous operation by the driver in the operation amount, the possibility of performing pre-collision control can be increased.

In the second aspect, the electronic control unit may be configured not to perform the pre-collision control when the accelerating operation amount becomes smaller than a second operation amount threshold value, the second operation amount threshold value being equal to or smaller than the first operation amount threshold value, during a period from a point in time at which the vehicle speed at the point in time at which the accelerating operation amount becomes equal to or larger than the first operation amount threshold value is equal to or less than the speed threshold value, to a point in time at which the possibility of collision between the target and the subject vehicle is determined to be higher than the collision threshold value.

With the above configuration, the possibility of performing unnecessary pre-collision control after the error in operation is eliminated can be reduced.

It is to be understood that respective constituent elements of the disclosure are not limited to those of embodiments which are specified by names and/or reference numerals in the embodiments. The other objects, other features, and resulting advantages will be easily understood from description about embodiments of the disclosure illustrated with reference to the following drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A driving assistance system (which may be called "assistance system") according to one embodiment of the disclosure will be described using the drawings. When a vehicle on which the assistance system is installed needs to be distinguished from other vehicles, the vehicle will be called "subject vehicle SV".

Figure 1:
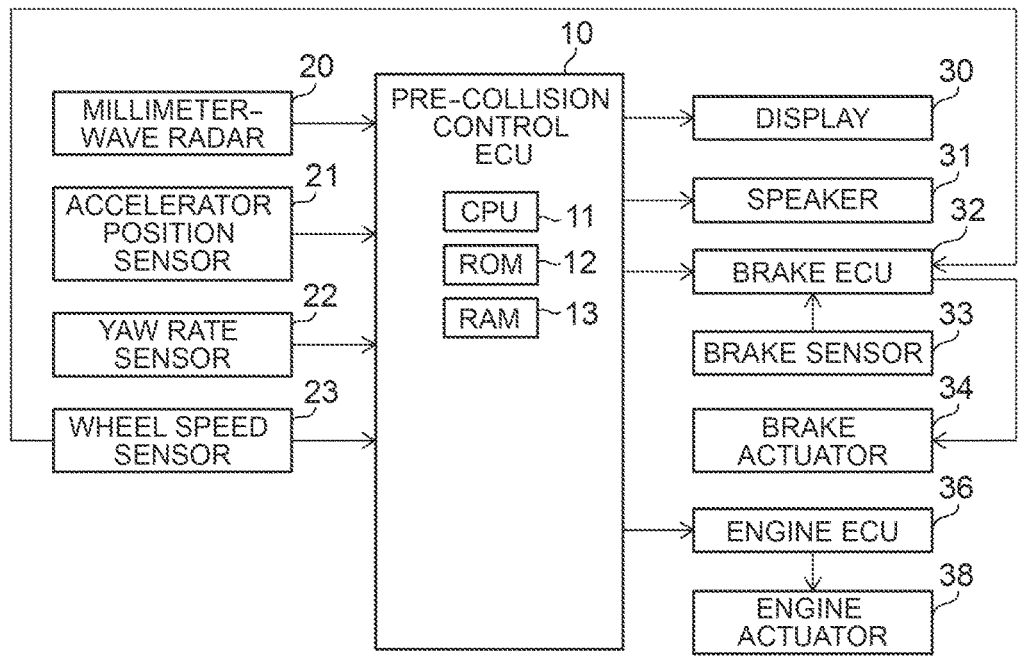
FIG. 1 is a view generally showing the system configuration of a driving assistance system according to one embodiment of the disclosure.

The assistance system performs pre-collision control, when a collision index value having a correlation with "a possibility of a collision between a target detected by a millimeter-wave radar 20 shown in FIG. 1 and the subject vehicle SV" satisfies a predetermined control start condition. The pre-collision control performed by the assistance system includes alarm control, preliminary braking, and main braking. The alarm control is performed at the earliest time, and the preliminary braking is performed at the second earliest time, while the main braking is performed at the latest time.

Under the alarm control, the driver is informed that there is a possibility of a collision with a target, by use of a display 30 (see FIG. 1) and a speaker 31 (see FIG. 1). Namely, a warning is generated to the driver of the subject vehicle so as to warn the driver of the possibility of occurrence of a collision.

In the preliminary braking and the main braking, the vehicle speed Vs of the subject vehicle SV is further reduced by braking, in order to avoid a collision with a target and/or reduce the speed at the time of a collision with a target. The main braking is different from the preliminary braking in that the main braking is performed until the vehicle speed Vs becomes equal to zero, and the vehicle speed Vs is kept at zero for a predetermined period of time after the vehicle speed Vs becomes equal to zero.

As shown in FIG. 1, the assistance system includes a pre-collision control ECU 10. The pre-collision control ECU 10 includes a microcomputer including CPU 11, ROM 12, RAM 13, etc. In this specification, ECU is an abbreviation for "Electronic Control Unit", and includes a microcomputer as a main part. The microcomputer includes CPU, and memories, such as ROM and RAM. The CPU implements various functions, by executing instructions (programs, routines) stored in the ROM.

The assistance system further includes a millimeter-wave radar 20, accelerator position sensor 21, yaw rate sensor 22, wheel speed sensors 23, display 30, speaker 31, brake ECU 32, brake sensor 33, brake actuator 34, engine ECU 36, and an engine actuator 38. The pre-collision control ECU 10 is connected to the millimeter-wave radar 20, accelerator position sensor 21, yaw rate sensor 22, wheel speed sensors 23, display 30, speaker 31, brake ECU 32, and the engine ECU 36.

Figure 2:
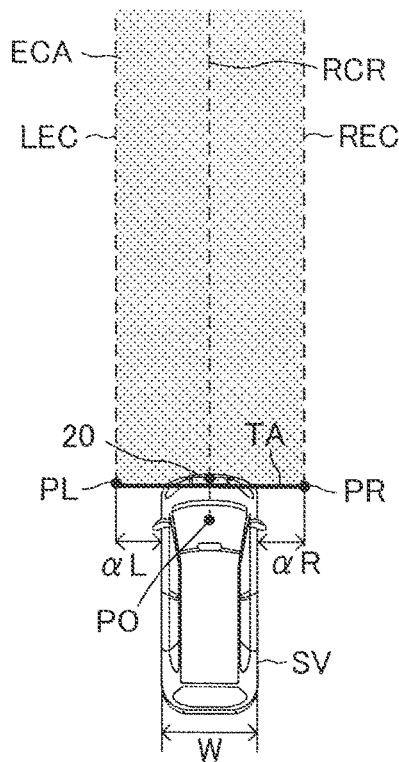
FIG. 2 is a view useful for explaining the mounting position of a millimeter-wave radar and a traveling predicted route.

As shown in FIG. 2, the millimeter-wave radar 20 is provided at a center position of a front end portion of the subject vehicle SV as viewed in the vehicle width direction. The millimeter-wave radar 20 detects the position of a target and the velocity of the target relative to the subject vehicle SV, using radio waves in a millimeter waveband (which will also be called "millimeter waves"). More specifically, the millimeter-wave radar 20 emits (transmits) millimeter waves, and receives millimeter waves (reflected waves) reflected by a target as a solid object that exists within a radiation range of millimeter waves. Then, the millimeter-wave radar 20 calculates the distance from the subject vehicle SV to the target, based on the time from transmission of the millimeter waves to receiving thereof, and also calculates the azimuth direction of the target as viewed from the subject vehicle SV, based on the direction of the reflected millimeter waves. The position of the target relative to the subject vehicle SV is specified, based on the distance from the subject vehicle SV to the target, and the azimuth direction of the target as viewed from the subject vehicle SV.

Further, the millimeter-wave radar 20 calculates the velocity of the target relative to the subject vehicle SV. More specifically, the millimeter-wave radar 20 calculates the velocity of the target relative to the subject vehicle SV, based on change in the frequency of the reflected millimeter waves (the Doppler effect). The millimeter-wave radar 20 sends target information including the position of the target and the relative velocity of the target, to the pre-collision control ECU 10.

Referring again to FIG. 1, the accelerator position sensor 21 detects the amount of operation (amount of depression) of the accelerator pedal of the subject vehicle, and generates a signal representing the accelerator pedal operation amount (which may also be called "accelerating operation amount") AP. The pre-collision control ECU 10 obtains (detects) the accelerator pedal operation amount AP from the accelerator position sensor 21 each time a predetermined time elapses.

The yaw rate sensor 22 detects the yaw rate Yr applied to the subject vehicle SV, and generates a signal representing the yaw rate Yr. The pre-collision control ECU 10 obtains (detects) the yaw rate from the yaw rate sensor 22 each time a predetermined time elapses.

The wheel speed sensor 23 is provided for each wheel of the subject vehicle SV, and detects a predetermined number of pulse signals (wheel pulse signal) generated each time each wheel makes one revolution. Then, the wheel speed sensor 23 sends the detected wheel pulse signal to the pre-collision control ECU 10. The pre-collision control ECU 10 computes the rotational speed (wheel speed) of each wheel, based on the number of pulses per unit time in the wheel pulse signal transmitted from each wheel speed sensor 23, and computes the vehicle speed Vs indicative of the speed of the subject vehicle SV, based on the wheel speed of each wheel. For example, the vehicle speed Vs is an average value of the wheel speeds of four wheels.

The display 30 is a head-up display (which will be denoted as "HUD") that receives display information from various ECUs and a navigation system in the subject vehicle SV, and displays the display information on a region (display region) as a part of a front window of the subject vehicle SV. On the display 30, an attention-seeking screen for calling the driver's attention to "an obstacle as a target having a high possibility of colliding with the subject vehicle SV, among targets detected by the millimeter-wave radar 20" is displayed. The display 30 displays the attention-seeking screen, when it receives display command information as a command for display of the attention-seeking screen from the pre-collision control ECU 10. The display 30 may be a liquid crystal display.

When the speaker 31 receives output command information as a command for output of an alarm, from the pre-collision control ECU 10, the speaker 31 generates "an alarm that calls the driver's attention" to an obstacle in response to the received output command information.

The brake ECU 32 is connected to the wheel speed sensors 23 and the brake sensor 33, and receives detection signals of these sensors. The brake sensor 33 detects parameters used when controlling a braking system (not shown) installed on the subject vehicle SV, and includes a sensor for detecting the operation amount (depression amount) of the brake pedal, for example.

Further, the brake ECU 32 is connected to the brake actuator 34. The brake actuator 34 is a hydraulically controlled actuator. The brake actuator 34 is disposed in a hydraulic circuit (not shown) between a master cylinder (not shown) that pressurizes hydraulic oil according to the force on the brake pedal, and a friction brake device (not shown) including a known wheel cylinder provided in each wheel. The brake actuator 34 adjusts the hydraulic pressure supplied to the wheel cylinder. The brake ECU 32 drives the brake actuator 34, so as to adjust the braking force (the acceleration (negative acceleration, or deceleration) of the subject vehicle SV) applied to each wheel.

When the brake ECU 32 receives a braking command signal from the pre-collision control ECU 10, it controls the brake actuator 34 to reduce the vehicle speed Vs by braking, so that the actual acceleration of the subject vehicle becomes equal to a target deceleration TG included in the braking command signal. The pre-collision control ECU 10 obtains the actual acceleration of the subject vehicle SV, based on the amount of change of the vehicle speed Vs per unit time.

The engine ECU 36 is connected to the engine actuator 38. The engine actuator 38 is an actuator for changing the operating state of an internal combustion engine (not shown) as a drive source of the subject vehicle SV, and includes at least a throttle valve actuator that changes the opening degree of the throttle valve. The engine ECU 36 can change torque generated by the internal combustion engine, by driving the engine actuator 38, whereby it can control the drive power of the subject vehicle SV. When a braking command signal is transmitted from the pre-collision control ECU 10 to the brake ECU 32, a torque reduction command signal is transmitted from the pre-collision control ECU 10 to the engine ECU 36. When the engine ECU 36 receives the torque reduction command signal, it drives the engine actuator 38 (actually, drives the throttle valve actuator to change the throttle opening to the minimum opening degree), so as to change the torque of the internal combustion engine to the minimum torque.

Summary of Operation

Next, the summary of operation of the assistance system will be described. The assistance system extracts targets presumed to have a possibility of colliding with the subject vehicle SV, as obstacles, from among the targets detected by the millimeter-wave radar 20. Then, the assistance system calculates a required time to collision TTC (Time To Collision) indicating a length of time it takes for each of the obstacles to collide with the subject vehicle SV, with respect to each of the obstacles.

In the case where the accelerator pedal operation amount AP is smaller than a threshold value APcth for control (for example, a value corresponding to 90% of the maximum accelerator pedal operation amount), the assistance system performs pre-collision control when the required time to collision TTC is equal to or less than a time threshold value T(n)th, and does not perform pre-collision control when the required time to collision TTC is greater than the time threshold value T(n)th.

On the other hand, in the case where the accelerator pedal operation amount AP is equal to or larger than the threshold value APcth for control, the assistance system also performs pre-collision control when the required time to collision TTC is equal to or less than the time threshold value T(n)th. However, the assistance system determines whether a permission condition is established. The permission condition is established when "erroneous pedal depression" occurs, namely, when the accelerator pedal is depressed by mistake, in place of the brake pedal. Then, when the accelerator pedal operation amount AP is equal to or larger than the threshold value APcth for control, and the required time to collision TTC is equal to or less than the time threshold value T(n)th, the assistance system performs pre-collision control if the permission condition has been established by this time, but does not perform pre-collision control if the permission condition has not been established by this time. The permission condition is established when "the accelerator pedal operation amount AP is equal to or larger than a first operation amount threshold value AP1th (e.g., 90% of the accelerator pedal operation amount), and the vehicle speed Vs is equal to or less than a speed threshold value V1th (e.g., 15 km/h)".

When the accelerator pedal operation amount AP is equal to or larger than the threshold value APcth for control, the accelerator pedal is in a condition where it is largely depressed through either one of the driver's intentional operation and erroneous pedal depression. Thus, when the accelerator pedal operation amount AP is equal to or larger than the threshold value APcth for control, and the required time to collision TTC becomes equal to or less than the time threshold value T(n)th, the assistance system determines whether the large depression of the accelerator pedal is caused by the driver's intentional operation or erroneous pedal depression, depending on whether there is a history of establishment of the permission condition. More specifically, if the permission condition has not been established by the time when the accelerator pedal operation amount AP is equal to or larger than the threshold value APcth for control, and the required time to collision TTC becomes equal to or less than the time threshold value T(n)th, the assistance system regards the depression of the accelerator pedal as being caused by the driver's intentional operation, and does not perform pre-collision control. On the other hand, if the permission condition has been established by the time when the accelerator pedal operation amount AP is equal to or larger than the threshold value APcth for control, and the required time to collision TTC becomes equal to or less than the time threshold value T(n)th, the assistance system regards the depression of the accelerator pedal as being erroneous pedal depression, and performs pre-collision control.

Thus, the pre-collision control can be performed without fail when erroneous pedal depression occurs, and a situation where "unnecessary pre-collision control is performed when erroneous pedal depression does not occur, and the driver is annoyed with the control" can be prevented.

Since the erroneous pedal depression is likely to occur at the start of the subject vehicle SV, it is highly likely to occur when the vehicle speed Vs is low (namely, when the vehicle speed Vs is equal to or less than the speed threshold value V1th). When erroneous pedal depression occurs, namely, when the accelerator pedal is depressed by mistake, the subject vehicle SV is rapidly accelerated. Accordingly, the driver is highly likely to immediately press down the accelerator pedal while mistaking the accelerator pedal for the brake pedal, in an attempt to decelerate the subject vehicle SV. Therefore, in the case where erroneous pedal depression occurs, the accelerator pedal operation amount AP is highly likely to be equal to or larger than the first operation amount threshold value AP1th when the subject vehicle SV is traveling at a relatively low speed (namely, when the vehicle speed Vs is equal to or less than the speed threshold value V1th). Accordingly, the assistance system determines that the permission condition is established, when "the accelerator pedal operation amount AP is equal to or larger than the first operation amount threshold value AP1th, and the vehicle speed Vs is equal to or less than the speed threshold value V1th".

On the other hand, when the subject vehicle SV overtakes or passes a forward vehicle, too, the accelerator pedal operation amount is highly likely to be equal to or larger than the first operation amount threshold value AP1th. However, such overtaking, passing, or the like, tends to be conducted when the vehicle speed Vs of the subject vehicle SV is relatively high; therefore, the vehicle speed Vs is highly likely to be equal to or greater than the speed threshold value V1th at the time when the accelerator pedal operation amount AP becomes equal to or larger than the first operation amount threshold value AP1th. Accordingly, the assistance system can determine that the permission condition is not established, when overtaking, passing, or the like, is conducted. Therefore, the assistance system can reduce the possibility that unnecessary pre-collision control is performed at the time of the driver's intentional operation of the accelerator pedal.

When the overtaking, passing, or the like, is conducted, the accelerator pedal operation amount increases, and the speed of depression of the accelerator pedal increases. The related system determines whether erroneous pedal depression occurs, based on the depression amount and depression speed of the accelerator pedal. Therefore, the related system is highly likely to mistake the overtaking, passing, or the like, for erroneous pedal depression, and perform unnecessary pre-collision control while overtaking, passing, or the like, is conducted.

The operation of the assistance system as described above may also be expressed as follows. Namely, when the accelerator pedal operation amount AP is equal to or larger than the threshold value APcth for control, and the required time to collision TTC is equal to or less than the time threshold value T(n)th, the assistance system determines that a predetermined control start condition is satisfied. Then, if the permission condition has been established by the time when the control start condition is satisfied, the assistance system determines that pre-collision control needs to be performed because the subject vehicle SV is highly likely to collide with the obstacle due to erroneous pedal depression, and performs pre-collision control. On the other hand, if the permission condition has not been established by the time when the control start condition is satisfied, the assistance system determines that pre-collision control need not be performed because the increased possibility of colliding with the obstacle is caused by the driver's intentional operation of the accelerator pedal, and the system does not perform pre-collision control.

The time threshold value T(n)th is set in advance for each of the three types of pre-collision control as described above, and is selected from a time threshold value T1th, time threshold value T2th, and a time threshold value T3th. The time threshold value T1th is a threshold value for alarm control, and the time threshold value T2th is a threshold value for preliminary braking, while the time threshold value T3th is a threshold value for main braking. The time threshold value T1th is the largest value, and the time threshold value T2th is the second largest value, while the time threshold value T3th is the smallest value.

Figure 3:
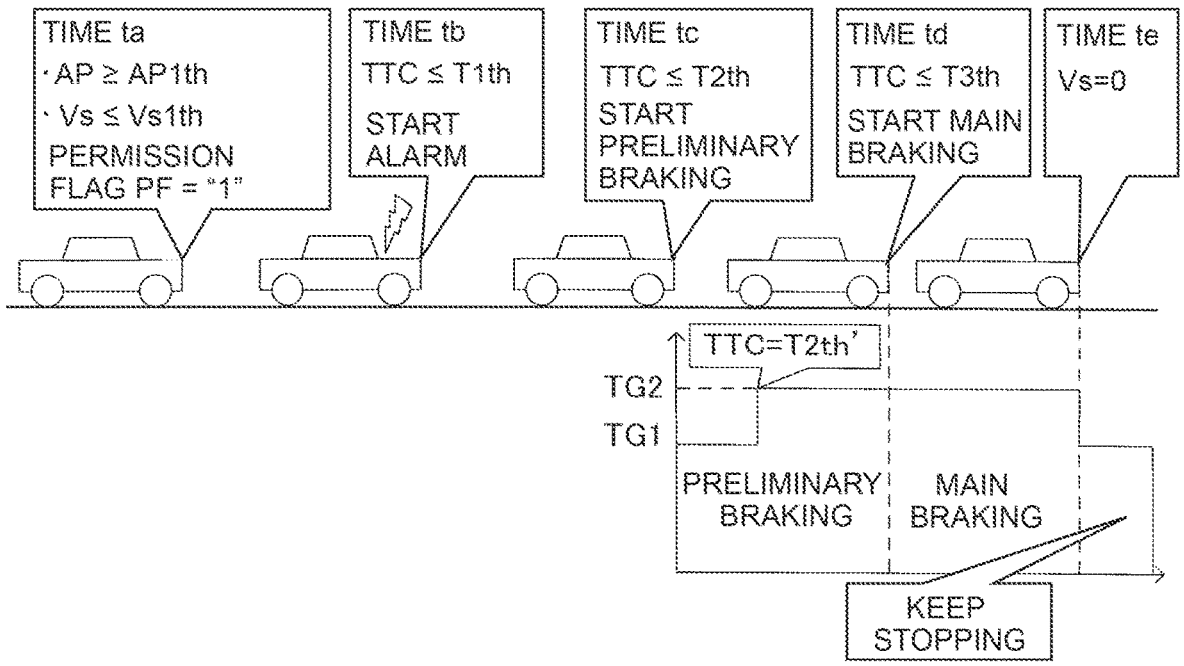
FIG. 3 is an explanatory view of the summary of operation of the driving assistance system shown in FIG. 1.

The operation of the assistance system will be additionally described, using an example illustrated in FIG. 3. In this example, the driver largely depresses the accelerator pedal while mistaking it for the brake pedal, at time "ta". Thus, at time "ta", the accelerator pedal operation amount AP increases from a value smaller than the first operation amount threshold value AP1$th$, to be equal to or larger than the first operation amount threshold value AP1$th$.

In this example, the driver is not aware that he/she depressed the accelerator pedal while mistaking it for the brake pedal. Therefore, the driver further depresses the accelerator pedal, and the accelerator pedal operation amount AP is equal to or larger than "the threshold value APcth for control, which is set to the same value as the first operation threshold value AP1$th$", in a period from time "ta" to time "td". Accordingly, in the period from time "ta" to time "td", the accelerator pedal operation amount AP does not become smaller than "a second operation amount threshold value AP2$th$ that is set to a value equal to or smaller than the first operation amount threshold value AP1$th$".

The vehicle speed Vs (which may also be called "operation-time vehicle speed Vs1") at "time "ta" at which the accelerator pedal operation amount AP becomes equal to the first operation amount threshold value AP1$th$" is equal to or less than the speed threshold value V1$th$. Accordingly, the assistance system determines that the permission condition is established at time "ta", and sets a value of a permission flag PF to "1".

If the value of the permission flag PF is set to "0", this means that the permission condition has not been established. If the value is set to "1", this means that the permission condition was established in the past. As will be described later, when the accelerator pedal operation amount AP becomes smaller than the second operation amount threshold value AP2$th$, the assistance system determines that a permission cancellation condition is established, and sets the value of the permission flag PF to "0".

As described above, in this example, the accelerator pedal operation amount AP does not become smaller than the second operation amount threshold value AP2$th$, in the period from time "ta" to time "td". Therefore, the value of the permission flag PF is not returned to "0" in the period from time "ta" to time "td".

At time "tb", the required time to collision TTC decreases from a value greater than the time threshold value T1$th$, to be equal to or less than the time threshold value T1$th$ for alarm control. Accordingly, at time "tb", the required time to collision TTC is equal to or less than the time threshold value T1$th$, and the accelerator pedal operation amount is equal to or larger than the threshold value APcth for control; therefore, a control start condition for alarm control (which will also be called "first control start condition") is established. Further, the permission condition is established at time "ta" prior to time "tb", and the accelerator pedal operation amount AP does not become smaller than the second operation amount threshold value AP2$th$; therefore, the permission cancellation condition is not established before time "tb". Therefore, at time "tb", the assistance system performs alarm control as pre-collision control.

At time "tc", the required time to collision TTC decreases from a value greater than the time threshold value T2$th$, to be equal to or less than the time threshold value T2$th$ for preliminary braking. Accordingly, at time "tc", the required time to collision TTC is equal to or less than the time threshold value T2$th$, and the accelerator pedal operation amount is equal to or larger than the threshold value APcth for control; therefore, a control start condition for preliminary braking (which will also be called "second control start condition") is established. Further, the permission condition is established at time "ta" prior to time "tc", and the permission cancellation condition is not established before time "tc". Therefore, at time "tc", the assistance system performs preliminary braking as pre-collision control.

In the preliminary braking, when the required time to collision TTC is equal to or less than the time threshold value T2$th$, and is greater than "a time threshold value T2$th'$ that is a smaller value than the time threshold value T2$th$", braking is performed at a target deceleration TG1. Further, when the required time to collision TTC is equal to or less than the time threshold value T2$th'$, and is greater than the time threshold value T3$th$, braking is performed at a target deceleration TG2 that is a larger value than the target deceleration TG1, and more rapid deceleration is performed.

At a point in time at which the required time to collision TTC becomes equal to or less than the time threshold value T2$th$, the assistance system calculates the target deceleration TG1, based on the distance between the subject vehicle SV and the target and the velocity of the target relative to the subject vehicle SV at this point in time. Then, the assistance system decelerates the subject vehicle SV at the calculated target deceleration TG1, until the required time to collision TTC becomes equal to or less than the time threshold value T2$th'$. At a point in time at which the required time to collision TTC becomes equal to or less than the time threshold value T2$th'$, the assistance system calculates the target deceleration TG2, based on the distance between the subject vehicle SV and the target and the velocity of the target relative to the subject vehicle SV at this point in time.

At time "td", the required time to collision TTC decreases from a value greater than the time threshold value T3$th$, to be equal to or less than the time threshold value T3$th$ for main braking. Accordingly, at time "td", the required time to collision TTC is equal to or less than the time threshold value T3$th$, and the accelerator pedal operation amount is equal to or larger than the threshold value APcth for control; therefore, a control start condition for main braking is established. Further, the permission condition is established at time "ta" prior to time "td", and the permission cancellation condition is not established in the period from time "ta" to time "td". Therefore, at time "td", the assistance system performs main braking as pre-collision control.

In the main braking, braking is performed at the above-mentioned target deceleration TG2, until the vehicle speed Vs becomes equal to zero (until the subject vehicle SV is stopped). At time "te", the vehicle speed Vs becomes equal to zero, and the subject vehicle SV is stopped. In the main braking, after the vehicle speed Vs becomes equal to zero (after the subject vehicle SV is stopped), the target deceleration is set to the target deceleration TG1, so that the vehicle speed Vs is kept at zero, for a predetermined period of time. At this time, the subject vehicle SV cannot be decelerated at the target deceleration TG1 since it is stopped: therefore, the brake ECU 32 determines that the braking force is insufficient, and drives the brake actuator 34, to keep the brake actuator 34 driven.

As is understood from the above example, in the case where "the control start condition that the required time to collision TTC is equal to or less than the time threshold value T(n)th, and the accelerator pedal operation amount AP is equal to or larger than the threshold value APcth for control" is established, the assistance system performs pre-collision control when the permission condition has been established by the time when the control start condition is established, and does not perform pre-collision control when the permission condition has not been established by the time when the control start condition is established. Thus, it is possible to reduce the possibility of performing unnecessary pre-collision control at the time of the driver's intentional operation, such as overtaking, and passing, while increasing the possibility of performing pre-collision control when erroneous pedal depression occurs.

Specific Operation

Figure 4:
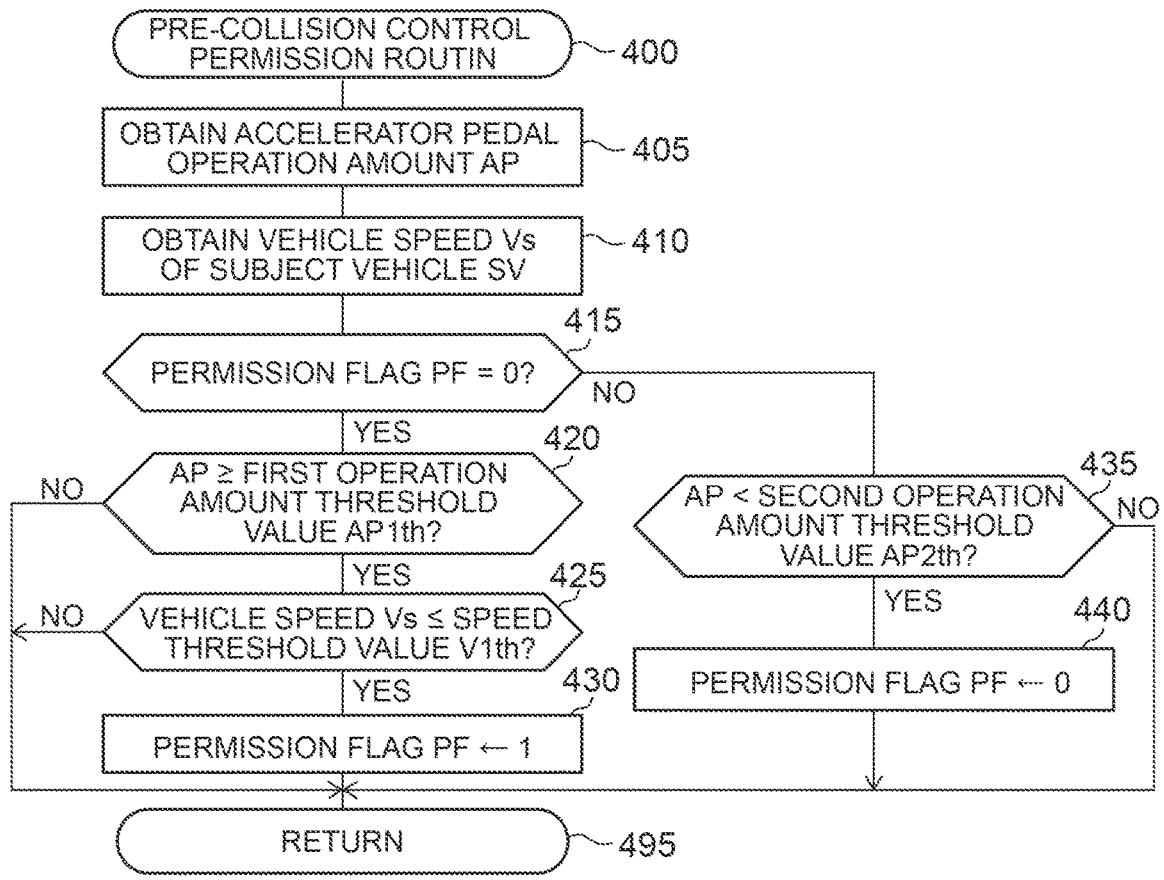
FIG. 4 is a flowchart illustrating a routine executed by a CPU of a pre-collision control ECU shown in FIG. 1.

The CPU 11 of the pre-collision control ECU 10 executes the routine illustrated in the flowchart of FIG. 4, each time a predetermined time elapses. The routine shown in FIG. 4 is provided for determining whether the permission condition is established when the permission condition has not been established, and determining whether the permission cancellation condition is established when the permission condition is established.

The CPU 11 starts processing from step 400 of FIG. 4 at the right time, and proceeds to step 405, to obtain the current accelerator pedal operation amount AP from the accelerator position sensor 21. The CPU 11 then proceeds to step 410, to obtain the vehicle speed Vs of the subject vehicle SV, based on the wheel pulse signals transmitted from the wheel speed sensors 23, and proceeds to step 415.

In step 415, the CPU 11 determines whether the value of the permission flag PF is set to "0". The value of the permission flag PF is set to "0", in the initial state (namely, at the time when an ignition key switch (not shown) of the subject vehicle is operated to be changed from the OFF position to the ON position).

When the value of the permission flag PF is set to "0", the CPU 11 makes an affirmative decision (YES) in step 415, and proceeds to step 420. In step 420, the CPU 11 determines whether the accelerator pedal operation amount AP obtained in step 405 is equal to or larger than the first operation amount threshold value AP1$th$. The first operation amount threshold value AP1$th$ is set to "90%".

When the accelerator pedal operation amount AP is smaller than the first operation amount threshold value AP1$th$, the CPU 11 makes a negative decision (NO) in step 420, and proceeds to step 495, to once finish this routine. As a result, the permission condition is not established, and the value of the permission flag PF is not changed from "0".

On the other hand, when the accelerator pedal operation amount AP is equal to or larger than the first operation amount threshold value AP1$th$, the CPU 11 makes an affirmative decision (YES) in step 420, and proceeds to step 425. In step 425, the CPU 11 determines whether the vehicle speed Vs obtained in step 410 is equal to or less than the speed threshold value V1$th$. The speed threshold value V1$th$ is set to "15 km/h".

When the vehicle speed Vs is greater than the speed threshold value V1$th$, the CPU 11 makes a negative decision (NO) in step 425, and proceeds to step 495, to once finish this routine. As a result, the permission condition is not established, and the value of the permission flag PF is not changed from "zero".

On the other hand, when the vehicle speed Vs is equal to or less than the speed threshold value V1$th$, the CPU 11 makes an affirmative decision (YES) in step 425, and proceeds to step 430. In step 430, the CPU 11 determines that the permission condition is established, and sets the value of the permission flag PF to "1". Then, the CPU 11 proceeds to step 495, to once finish this routine. As a result, the value of the permission flag PF is changed from "0" to "1".

On the other hand, when the value of the permission flag PF is not equal to "0" at the time when the CPU 11 executes step 415 (namely, when the value of the permission flag PF is equal to "1", and the permission condition is established), the CPU 11 makes a negative decision "NO" in step 415, and proceeds to step 435. In step 435, the CPU 11 determines whether the accelerator pedal operation amount AP obtained in step 405 becomes smaller than the second operation amount threshold value AP2$th$. The second operation amount threshold value AP2$th$ is set to "70%".

When the accelerator pedal operation amount AP is equal to or larger than the second operation amount threshold value AP2$th$, the CPU 11 makes a negative decision (NO) in step 435, and proceeds to step 495, to once finish this routine. As a result, the permission cancellation condition is not established, and the value of the permission flag PF is not changed from "1".

On the other hand, when the accelerator pedal operation amount AP becomes smaller than the second operation amount threshold value AP2$th$, the CPU 11 makes an affirmative decision (YES) in step 435, and proceeds to step 440. In step 440, the CPU 11 determines that the permission cancellation condition is established, and sets the value of the permission flag PF to "0". Then, the CPU 11 proceeds to step 495, to once finish this routine. As a result, the value of the permission flag PF is changed from "1" to "0".

As is understood from the above description, when the accelerator pedal operation amount AP is equal to or larger than the first operation amount threshold value AP1$th$, and the vehicle speed Vs is equal to or less than the speed threshold value V1$th$, it is determined that the permission condition is established, and the value of the permission flag PF is set to "1". Thus, implementation of pre-collision control, which is performed in the case where the accelerator pedal operation amount AP is equal to or larger than the threshold value APc$th$ for control, is permitted, as will be described later. Thus, the possibility of permitting implementation of pre-collision control without fail at the time of occurrence of erroneous pedal depression can be increased. Further, when the accelerator pedal operation amount AP becomes smaller than the second operation amount threshold value AP2$th$ after the permission condition is once established (namely, after the value of the permission flag PF is set to "1"), it is determined that the permission cancellation condition is established, and the value of the permission flag PF is set to "0". Thus, implementation of pre-collision control, which is performed in the case where the accelerator pedal operation amount AP is equal to or larger than the threshold value APc$th$ for control, is inhibited, as will be described later. It is thus possible to prevent unnecessary pre-collision control from being performed when erroneous pedal depression once occurs, and then the error in pedal depression is eliminated.

Figure 5:
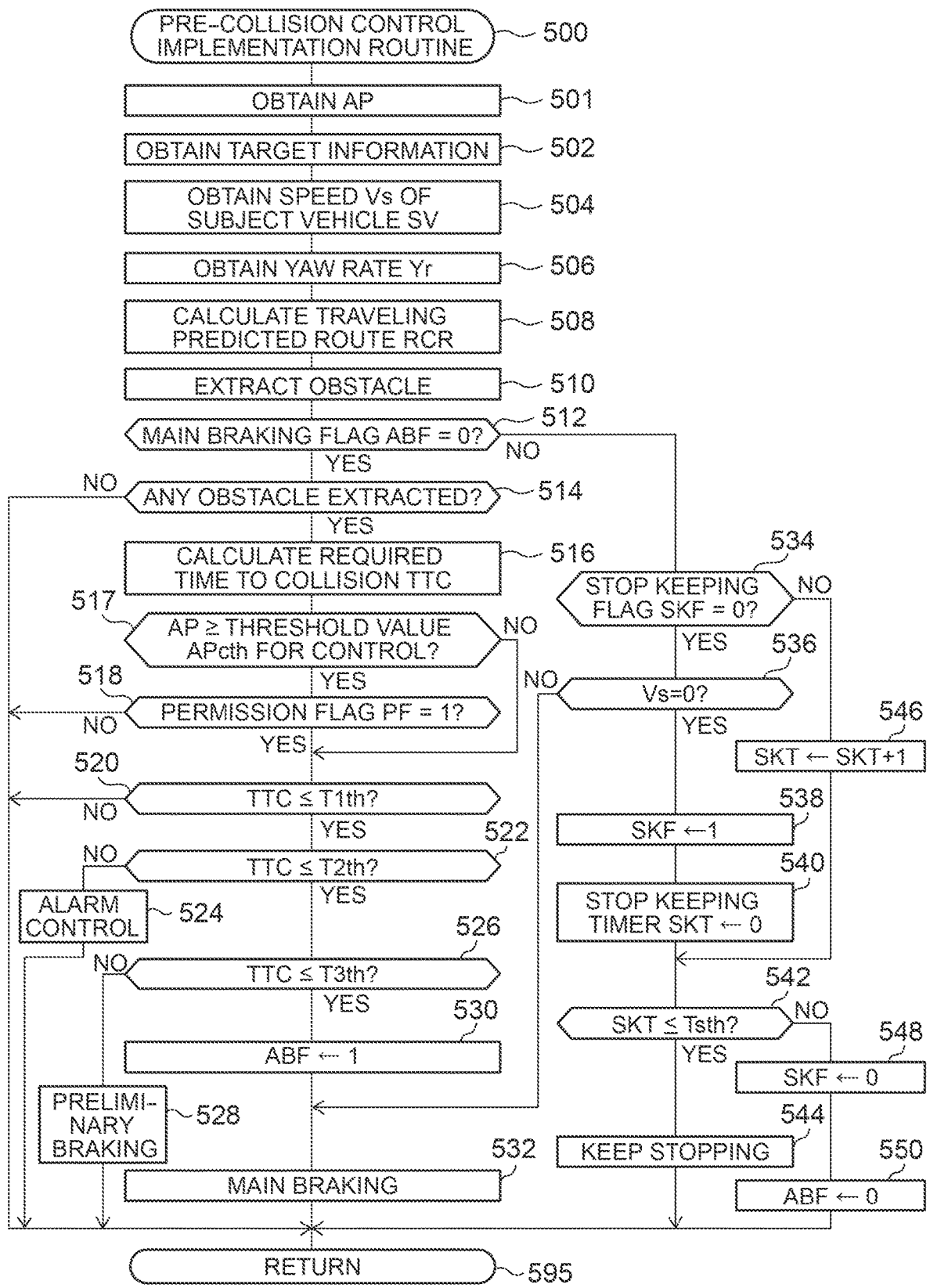
FIG. 5 is a flowchart illustrating another routine executed by the CPU of the pre-collision control ECU shown in FIG. 1.

Further, the CPU 11 of the pre-collision control ECU 10 executes a routine illustrated in the flowchart of FIG. 5 each time a predetermined time elapses. The routine illustrated in FIG. 5 is provided for determining whether implementation of pre-collision control is permitted.

The CPU 11 starts processing from step 500 of FIG. 5 at the right time, executes step 501 through step 510 in the order of description below, and proceeds to step 512.

In step 501, the CPU 11 obtains the current accelerator pedal operation amount AP from the accelerator position sensor 21. In step 502, the CPU 11 obtains target information from the millimeter-wave radar 20. In step 504, the CPU 11 obtains the vehicle speed Vs of the subject vehicle SV, based on the wheel pulse signals from the wheel speed sensors 23. In step 506, the CPU 11 obtains the yaw rate Yr applied to the subject vehicle SV, from the yaw rate sensor 22.

In step 508, the CPU 11 calculates a traveling predicted route RCR (see FIG. 2) of the subject vehicle SV. The operation of step 508 will be described in detail. The CPU 11 calculates the turning radius of the subject vehicle SV, based on the vehicle speed Vs of the subject vehicle SV obtained in step 504, and the yaw rate Yr obtained in step S506. Then, the CPU 11 estimates a traveling route for which a center point in the vehicle width direction of the subject vehicle SV (actually, a center point PO (see FIG. 2) on the axle of the right and left front wheels of the subject vehicle SV) is heading, as the traveling predicted route RCR, based on the calculated turning radius. When the yaw rate Yr appears, the assistance system estimates an arc-like route, as the traveling predicted route RCR. On the other hand, when the yaw rate Yr is equal to zero, the assistance system estimates a straight route that extends in the direction of acceleration applied to the subject vehicle SV, as the traveling predicted route RCR.

In step 510, the CPU 11 extracts characteristic points selected from targets indicated by the target information and presumed to have a possibility of colliding with the subject vehicle SV (including characteristic points presumed to come very close to the subject vehicle SV though not supposed to collide with the subject vehicle SV), as obstacles, based on "the position and velocity of each target" and the traveling predicted route RCR of the subject vehicle SV.

The operation of step 510 will be described in detail with reference to FIG. 2. The CPU 11 estimates a left-hand traveling predicted route LEC that passes a point PL located further on the left-hand side of a left end portion of the vehicle body of the subject vehicle SV by a given distance $\alpha L$, and a right-hand traveling predicted route REC that passes a point PR located further on the right-hand side of a right end portion of the vehicle body of the subject vehicle SV by a given distance $\alpha R$, based on "the traveling predicted route RCR having a finite length". The left-hand traveling predicted route LEC is formed by translating the traveling predicted route RCR to the left in the lateral direction of the subject vehicle SV, by "a value obtained by adding one half (W/2) of the vehicle width W to the distance $\alpha L$". The right-hand traveling predicted route REC is formed by translating the traveling predicted route RCR to the right in the lateral direction of the subject vehicle SV, by "a value obtained by adding one half (W/2) of the vehicle width W to the distance $\alpha R$". The distance $\alpha L$ and the distance $\alpha R$ are equal to or larger than zero, and may be different from or equal to each other. Further, the CPU 11 specifies a region between the left-hand traveling predicted route LEC and the right-hand traveling predicted route REC, as a traveling predicted route region ECA.

Then, the CPU 11 calculates (estimates) a movement locus of each target, based on the past position of the target, and calculates a direction of movement of the target relative to the subject vehicle SV, based on the calculated movement locus of the target. Then, the CPU 11 extracts targets that already exist in the traveling predicted route region ECA and are predicted to intersect with a leading end region TA of the subject vehicle SV, and targets that will enter the traveling predicted route region ECA in the future and are predicted to intersect with the leading end region TA of the subject vehicle SV, as obstacles having a possibility of colliding with the subject vehicle SV, based on the traveling predicted route region ECA, relationships (relative position and relative velocity) between the subject vehicle SV and each target, and the direction of movement of the target relative to the subject vehicle SV. Here, the leading end region TA of the subject vehicle SV is a region represented by a segment that connects point PL and point PR.

The CPU 11 estimates the left-hand traveling predicted route LEC as a route the point PL passes, and estimates the right-hand traveling predicted route REC as a route the point PR passes. Therefore, if the value $\alpha L$ and value $\alpha R$ are positive values, the CPU 11 determines a target having a possibility of passing through the vicinity of the left side face or the right side face of the subject vehicle SV, as "a target that already exists in the traveling predicted route region ECA, and is predicted to intersect with the leading end region TA of the subject vehicle SV" or "a target that will enter the traveling predicted route region ECA in the future, and is predicted to intersect with the leading end region TA of the subject vehicle SV". Accordingly, the CPU 11 extracts a target having a possibility of passing through the left-hand side or right-hand side of the subject vehicle SV, as an obstacle.

Then, the CPU 11 proceeds to step 512, to determine whether the value of a main braking flag ABF that will be described later is set to "0". The value of the main braking flag ABF is set to "1" at the time when main braking is started, and is set to "0" at the time when a predetermined time elapses from the time when the subject vehicle SV is stopped. The value of the main braking flag ABF is set to "0", in the initial state (namely, at the time when the ignition key switch of the subject vehicle SV is operated to be changed from the OFF position to the ON position).

When the value of the main braking flag ABF is "0", the CPU 11 makes an affirmative decision (YES) in step 512, and proceeds to step 514, to determine whether any obstacle is extracted in step 510. When no obstacle is extracted in step 510, the CPU 11 makes a negative decision (NO) in step 514, and proceeds to step 595, to once finish this routine. As a result, no pre-collision control is performed.

On the other hand, when an obstacle is extracted in step 510, the CPU 11 makes an affirmative decision (YES) in step 514, and proceeds to step 516, to calculate the required time to collision TTC (Time to Collision) indicating a length of time it takes for the obstacle to intersect with the region TA of the subject vehicle SV.

Here, the operation to calculate the required time to collision TTC of the obstacle will be described. The CPU 11 calculates the required time to collision TTC of the obstacle, by dividing the distance (relative distance) between the subject vehicle SV and the obstacle, by the velocity of the obstacle relative to the subject vehicle SV.

The required time to collision TTC is one of time T1 and time T2 as follows. Time T1 is a period of time from the current point in time to a point in time at which the obstacle is predicted to collide with the subject vehicle SV (a time period from the current time to the predicted time of collision). Time T2 is a period of time from the current point in time to a point in time at which the obstacle having a possibility of passing through one side of the subject vehicle SV comes closest to the subject vehicle SV (a time period from the current time to the predicted time of closest approach).

The required time to collision TTC is a length of time it takes for the obstacle to reach "the leading end region TA of the subject vehicle SV" in the case where it is assumed that the obstacle and the subject vehicle SV will move while keeping the relative velocity and relative movement direction at the current point in time.

Further, the required time to collision TTC represents a length of time within which pre-collision control for preparing for a collision between the subject vehicle SV and the obstacle, or collision avoidance operation by the driver, can be performed. Further, the required time to collision TTC is an index value (collision index value) having a correlation with the possibility (collision possibility) with which the obstacle and the subject vehicle SV collide with each other. The required time to collision TTC indicates a higher collision possibility as its value is smaller, and indicates a lower collision possibility as its value is larger.

After execution of step 516, the CPU 11 proceeds to step 517, to determine whether the accelerator pedal operation amount AP obtained in step 501 is equal to or larger than the threshold value APcth for control. The threshold value APcth for control is set to "90%". When the accelerator pedal operation amount AP is equal to or larger than the threshold value APcth for control, the CPU 11 makes an affirmative decision (YES) in step 517, and proceeds to step 518.

In step 518, the CPU 11 determines whether the value of the permission flag PF is set to "1". When the value of the permission flag PF is "0", the CPU 11 makes a negative decision (NO) in step 518, and proceeds to step 595, to once finish this routine. The negative decision (NO) is made in step 518, in a situation where the accelerator pedal operation amount AP at the current time is equal to or larger than the threshold value APcth for control, but the permission condition has not been established by the current time. As one example of this situation, the accelerator pedal is largely depressed when the vehicle speed Vs is greater than the speed threshold value V1th, so that the accelerator pedal operation amount becomes equal to or larger than the threshold value APcth for control. In this situation, the driver's intentional operation, such as overtaking, or passing, is highly likely to be performed. Therefore, the CPU 11 does not perform pre-collision control, even when the required time to collision TTC is equal to or less than the time threshold value T(n)th. Accordingly, the CPU 11 once finishes this routine without executing steps (step 520 through step 532) for performing pre-collision control. As a result, no pre-collision control is performed.

On the other hand, when the value of the permission flag PF is "1", the CPU 11 makes an affirmative decision (YES) in step 518, and proceeds to step 520. When the accelerator pedal operation amount AP is equal to or larger than the threshold value APcth for control, and the value of the permission flag PF is "1", the permission condition has been established by the current point in time, and depression of the accelerator pedal at the current time is highly likely to be erroneous or wrong pedal depression. Therefore, the CPU 11 performs pre-collision control, when the required time to collision TTC is equal to or less than the time threshold value T(n)th. Accordingly, in step 520, the CPU 11 determines whether the required time to collision TTC calculated in step 516 is equal to or less than the time threshold value T1th for alarm control.

When the required time to collision TTC is greater than the time threshold value T1th, the CPU 11 makes a negative decision (NO) in step 520, and proceeds to step 595, to once finish this routine. In this case, the required time to collision TTC is greater than the time threshold value T1th as the largest value among the time threshold values T(n)th; therefore, no pre-collision control is performed.

When the required time to collision TTC is equal to or less than the time threshold value T1th, the CPU 11 makes an affirmative decision (YES) in step 520, and proceeds to step 522, to determine whether the required time to collision TTC is equal to or less than the time threshold value T2th for preliminary braking.

When the required time to collision TTC is greater than the time threshold value T2th (namely, when the required time to collision TTC is greater than the time threshold value T2th, and is equal to or less than the time threshold value T1th), the CPU 11 makes a negative decision (NO) in step 522, and proceeds to step 524. In step 524, the CPU 11 performs the alarm control (warning), and proceeds to step 595, to once finish this routine. More specifically, in step 524, the CPU 11 sends display command information to the display 30, and causes the display 30 to display the attention-seeking screen. Further, in step 524, the CPU 11 sends output command information to the speaker 31, and causes the speaker 31 to generate the alarm sound.

On the other hand, when the required time to collision TTC is equal to or less than the time threshold value T2th, the CPU 11 makes an affirmative decision (YES) in step 522, and proceeds to step 526, to determine whether the required time to collision TTC is equal to or less than the time threshold value T3th for main braking.

When the required time to collision TTC is greater than the time threshold value T3th (namely, when the required time to collision TTC is greater than the time threshold value T3th, and is equal to or less than the time threshold value T2th), the CPU 11 makes a negative decision (NO) in step 526, and proceeds to step 528. In step 528, the CPU 11 performs the preliminary braking, and proceeds to step 595, to once finish this routine. More specifically, when the minimum required time to collision TTC calculated in step 516 is equal to or less than the time threshold value T2th, and is greater than the time threshold value T2th', the CPU 11 sends a braking command signal for decelerating the subject vehicle SV at the target deceleration TG1, to the brake ECU 32, and sends a torque reduction command signal to the engine ECU 36. On the other hand, when the minimum required time to collision TTC calculated in step 516 is equal to or less than the time threshold value T2th', and is greater than the time threshold value T3th, the CPU 11 sends a braking command signal for decelerating the subject vehicle SV at the target deceleration TG2, to the brake ECU 32, and sends a torque reduction command signal to the engine ECU 36.

On the other hand, when the required time to collision TTC is equal to or less than the time threshold value T3th, the CPU 11 makes an affirmative decision (YES) in step 526, and proceeds to step 530. In step 530, the CPU 11 sets the value of the main braking flag ABF to "1", and proceeds to step 532. In step 532, the CPU 11 performs the main braking, and proceeds to step 595, to once finish this routine. More specifically, the CPU 11 sends a braking command signal for decelerating the subject vehicle SV at the target deceleration TG2, to the brake ECU 32, and sends a torque reduction command signal to the engine ECU 36.

The main braking, once it is performed, continues to be performed until the vehicle speed Vs becomes equal to zero, regardless of the presence or absence of any obstacle and the required time to collision TTC. Accordingly, in a cycle of this routine executed after the value of the main braking flag ABF is set to "1" in step 530, and the main braking is performed in step 532, the CPU 11 makes a negative decision (NO) in step 512 when it proceeds to step 512, and proceeds to step 534.

In step 534, the CPU 11 determines whether a value of a stop keeping flag SKF is "0". The value of the stop keeping flag SKF is set to "1" when the vehicle speed Vs becomes equal to zero while the main braking is being performed, and is set to "0" when a predetermined time elapses from the time when the vehicle speed Vs becomes equal to zero. The value of the stop keeping flag SKF is set to "0", in the initial state (at the time when the ignition key switch of the subject vehicle SV is operated to be changed from the OFF position to the ON position).

When the value of the stop keeping flag SKF is "0", the CPU 11 makes an affirmative decision (YES) in step 534, and proceeds to step 536, to determine whether the vehicle speed Vs obtained in step 504 is equal to zero.

When the vehicle speed Vs is not equal to zero, the CPU 11 makes a negative decision (NO) in step 536, and proceeds to step 532, to perform main braking and reduce the vehicle speed Vs. Then, the CPU 11 proceeds to step 595, to once finish this routine.

On the other hand, when the vehicle speed Vs becomes equal to zero through implementation of main braking, the CPU 11 makes an affirmative decision (YES) in step 536, proceeds to step 538, to set the value of the stop keeping flag SKF to "1", and proceeds to step 540. In step 540, the CPU 11 sets a value of "a stop keeping timer SKT used for determining whether the predetermined time has elapsed from the time when the vehicle speed Vs becomes equal to zero" to "0", so as to initialize the stop keeping timer SKT, and proceeds to step 542.

In step 542, the CPU 11 determines whether the value of the stop keeping timer SKT is equal to or less than a timer threshold value Tsth. When the value of the stop keeping timer SKT is equal to or less than the timer threshold value Tsth, the CPU 11 makes an affirmative decision (YES) in step 542, and proceeds to step 544. In step 544, the CPU 11 performs stop keeping control for keeping the subject vehicle SV in a stopped state (namely, keeping the vehicle speed Vs equal to zero), and proceeds to step 595, to once finish this routine. More specifically, in step 544, the CPU 11 sends a braking command signal for decelerating the subject vehicle SV at the target deceleration TG1, to the brake ECU 32, and sends a torque reduction command signal to the engine ECU 36.

When this routine is executed after the value of the stop keeping flag SKF is set to "1" in step 538, and the CPU 11 proceeds to step 534, the value of the stop keeping flag SKF is set to "1". Therefore, the CPU 11 makes a negative decision (NO) in step 534, and proceeds to step 546. In step 546, the CPU 11 sets a value obtained by adding "1" to the current value of the stop keeping timer SKT, as a new value of the stop keeping timer SKT, and proceeds to step 542.

Accordingly, from the time when the value of the stop keeping timer SKT is set to "1", to the time when an affirmative decision (YES) is obtained in step 542 (namely, until the predetermined time elapses from the time when the vehicle speed Vs becomes equal to zero), "1" is added to the value of the stop keeping timer SKT in step 546, and stop keeping control continues to be performed in step 544.

Then, when this routine is executed in the case where the value of the stop keeping timer SKT becomes greater than the timer threshold value Tsth, and the CPU 11 proceeds to step 542, the CPU 11 makes a negative decision (NO) in step 542, and proceeds to step 548. In step 548, the CPU 11 sets the value of the stop keeping flag SKF to "0", and proceeds to step 550, to set the value of the main braking flag ABF to "0". Then, the CPU 11 proceeds to step 595, to once finish this routine.

When the required time to collision TTC becomes equal to or less than the time threshold value T3$th$, the value of the main braking flag ABF is set to "1", and main braking is performed. Once the main braking is performed, the value of the main braking flag ABF is not set to "0" until the predetermined time elapses from the time when the vehicle speed Vs becomes equal to zero. While the value of the main braking flag is set to "1", a negative decision (NO) is obtained in step 512; therefore, step 514 through step 530 are not executed, and deceleration through main braking is performed until the vehicle speed Vs becomes equal to zero, without using the required time to collision TTC, and the subject vehicle SV is kept in the stopped state until the predetermined time elapses from the time when the vehicle speed Vs becomes equal to zero. Thus, the required time to collision TTC is not used once main braking is performed, because the millimeter-wave radar 20 has large errors in detection of the position and relative velocity of each target that exists within a range of a short distance.

When the accelerator pedal operation amount AP obtained in step 501 is smaller than the threshold value APcth for control, at the time when the CPU 11 executes step 517, the CPU 11 makes a negative decision (NO) in step 517, and proceeds to step 520 and subsequent steps, without executing step 518. Namely, when the accelerator pedal operation amount AP is smaller than the threshold value APcth for control, the CPU 11 performs pre-collision control if the required time to collision TTC is equal to or less than the time threshold value T(n)th, and does not perform pre-collision control if the required time to collision TTC is greater than the time threshold value T(n)th, without depending on the value of the permission flag PF (without depending on whether the permission condition is established).

As is understood from the above example, when the permission condition that the accelerator pedal operation amount AP is equal to or larger than the first operation amount threshold value AP1$th$, and the vehicle speed Vs is equal to or less than the speed threshold value V1$th$ is established, the assistance system sets the value of the permission flag PF to "1" in step 430 shown in FIG. 4. When the accelerator pedal operation amount AP is equal to or larger than the threshold value APcth for control, and the value of the permission flag PF is set to "1", an affirmative decision (YES) is obtained in step 518 shown in FIG. 5, and pre-collision control is performed when the required time to collision TTC is equal to or less than the time threshold value T(n)th. Thus, when the collision possibility is increased due to occurrence of erroneous pedal depression, the possibility of performing pre-collision control without fail can be increased.

On the other hand, when the situation where the accelerator pedal operation amount AP is equal to or larger than the first operation amount threshold value AP1$th$, and the vehicle speed Vs is equal to or less than the speed threshold value V1$th$ does not take place, the permission condition is not established, and the value of the permission flag PF is kept at "0". When the accelerator pedal operation amount AP is equal to or larger than the threshold value APcth for control, and the value of the permission flag PF is set to "0" (namely, when the permission condition is not established), the CPU 11 makes a negative decision (NO) in step 518 shown in FIG. 5, and once finishes the routine shown in FIG. 5 without performing pre-collision control. Thus, even if the accelerator pedal is largely depressed (namely, the accelerator pedal operation amount AP is equal to or larger than the threshold value APcth for control) when erroneous pedal depression does not occur, and the collision possibility is increased, it is determined that the vehicle is being subjected to intentional operation by the driver, and no pre-collision control is performed. It is thus possible to reduce the possibility of performing unnecessary pre-collision control during the driver's intentional operation.

The disclosure is not limited to the embodiment as described above, but various modified examples of the disclosure may be employed. For example, while the accelerator pedal operation amount AP is detected by the accelerator position sensor 21 in the above embodiment, the accelerator pedal operation amount AP may be detected by a throttle position sensor (not shown). The throttle position sensor is provided for detecting the opening degree of the throttle valve of the internal combustion engine. The opening degree of the throttle valve has a correlation with the accelerator pedal operation amount AP such that the throttle opening increases as the accelerator pedal operation amount AP increases.

Further, in step 420 shown in FIG. 4, the CPU 11 may determine whether the accelerator pedal operation amount AP is equal to or larger than the first operation amount threshold value AP1*th*, and the depression speed indicating the speed of depression of the accelerator pedal is equal to or greater than a depression speed threshold value. When the accelerator pedal operation amount AP is equal to or larger than the first operation amount threshold value AP1*th*, and the depression speed is equal to or greater than the depression speed threshold value, the CPU 11 makes an affirmative decision (YES) in step 420, and proceeds to step 425. On the other hand, when at least one of the case where the accelerator pedal operation amount AP is smaller than the first operation amount threshold value AP1*th*, and the case where the depression speed is less than the depression speed threshold value, is established, the CPU 11 makes a negative decision (NO) in step 420, and proceeds to step 495, to once finish this routine.

In step 435 shown in FIG. 4, the CPU 11 may determine whether the minimum required time to collision TTC (the current TTC) calculated in step 516 of the routine shown in FIG. 5 executed at a point in time closest to the current time is greater than the minimum required time to collision TTC (the last TTC) calculated in step 516 of the routine shown in FIG. 5 executed at a point in time one cycle before the above point in time (a point in time earlier by a predetermined time than the above point in time). When the current TTC is greater than the last TTC, the CPU 11 makes an affirmative decision (YES) in step 435, and proceeds to step 440, to set the value of the permission flag PF to "0". On the other hand, when the current TTC is equal to or less than the last TTC, the CPU 11 makes a negative decision (NO) in step 435, and proceeds to step 495, to once finish the routine shown in FIG. 4. When the driver avoided a collision with an obstacle through steering operation, the current TTC for the obstacle becomes greater than the last TTC. In this case, the assistance system sets the value of the permission flag PF to "0", and can determine that the permission cancellation condition is established. Further, this operation (operation to set the value of the permission flag PF to "0" when the current TTC is greater than the last TTC) may be performed when the accelerator pedal operation amount AP is equal to or larger than the second operation amount threshold value AP2*th* (when a negative decision (NO) is obtained in step 435 of FIG. 4).

When the current TTC is greater than the last TTC, and an absolute value of a subtraction value (difference) between the current TTC and the last TTC is equal to or larger than a predetermined value, the CPU 11 may make an affirmative decision (YES) in step 435, and set the value of the permission flag PF to "0".

The CPU 11 may use a target deceleration TG, in place of the required time to collision TTC, as the collision index value having a correlation with the collision possibility. In this case, in step 516 shown in FIG. 5, the CPU 11 calculates a deceleration with which the subject vehicle SV can stop before reaching each obstacle, as the target deceleration TG, based on the relative velocity of each obstacle, and the distance between each obstacle and the subject vehicle SV. Where the direction in which the subject vehicle SV is accelerated is set to a positive value, the target deceleration TG, which is a deceleration, becomes a negative value. Thus, the collision possibility increases as the target deceleration TG as a negative value is smaller. Accordingly, no matter whether the required time to collision TTC is used or the target deceleration TG is used as the collision index value, the collision index value becomes a smaller value as the collision possibility increases.

The collision index value may be any value based on which the possibility of a collision between an obstacle and the subject vehicle SV can be determined. For example, the collision index value may be the velocity of the obstacle relative to the subject vehicle SV, the distance of the obstacle relative to the subject vehicle SV, the lateral velocity of the obstacle relative to the subject vehicle SV, or the like.

The threshold value APcth for control may be different from the first operation amount threshold value AP1*th*. In this case, it is desirable that the threshold value APcth for control is set to a value equal to or larger than the second operation amount threshold value AP2*th*.

In the routine shown in FIG. 5, the CPU 11 may perform alarm control in step 524, immediately after an affirmative decision (YES) is obtained in step 520, and then proceed to step 522. In this manner, alarm control is performed even while preliminary braking or main braking is being performed.

The pre-collision control may be carried out only when the vehicle speed Vs is within a predetermined range.

In step 508 of the routine shown in FIG. 5, the CPU 11 may calculate the turning radius of the subject vehicle SV, based on the vehicle speed Vs of the subject vehicle SV and "the steering angle θ of the steering wheel detected by a steering angle sensor (not shown)", and calculate the traveling predicted route RCR.

The target deceleration TG for use in preliminary braking may be calculated each time the required time to collision TTC becomes equal to or less than the time threshold value T2*th*, and step 526 shown in FIG. 5 is executed, based on the distance between the obstacle and the subject vehicle SV and the velocity of the obstacle relative to the subject vehicle SV at that point in time. In this case, the target deceleration TG2 for use in main braking is set to the target deceleration TG calculated last during preliminary braking, and the target deceleration TG1 for use in main braking is set to the target deceleration TG calculated first during preliminary braking.

The millimeter-wave radar 20 may be replaced with a monocular camera or a stereo camera capable of detecting the distance between the subject vehicle SV and a target, and the azimuth direction of the target as viewed from the subject vehicle SV. In this case, the relative velocity of the target is calculated based on the past position of the target.

The position of a target and the relative velocity of the target may be detected by combining the target detection result of the millimeter-wave radar 20 with the detection result of a monocular camera or a stereo camera.

The millimeter-wave radar 20 may be any type of sensor provided that it detects a target by emitting a radio medium, and receiving the radio medium reflected by the target. Thus, an infrared radar or a sonar radar may be used, in place of the millimeter-wave radar 20.

The display 30 is not particularly limited to the HUD. Namely, the display 30 may be a MID (Multi-Information Display), a touch panel of a navigation system, or the like. The MID is a display panel located on the dashboard as a collection of meters, such as a speedometer, tachometer, fuel gauge, water temperature gauge, odometer/trip meter, and warning lamps, for example.

What is claimed is:

1. A driving assistance system comprising:
a target detector configured to detect a target around a subject vehicle;
an operation amount sensor configured to obtain an accelerating operation amount corresponding to an operation amount of a driver of the subject vehicle;
a speed sensor configured to detect a vehicle speed, the vehicle speed being a speed of the subject vehicle; and
an electronic control unit configured to perform pre-collision control for avoiding a collision with the target by performing a braking control to apply braking force to the subject vehicle during preliminary and main braking,
the electronic control unit is further configured to:
store permission information when a permission condition that the obtained accelerating operation amount is equal to or larger than a first operation amount threshold value, and the detected vehicle speed is equal to or less than a speed threshold value, is established;
determine, when a possibility of a collision between the target and the subject vehicle is equal to or higher than a possibility threshold value, that a control start condition is satisfied irrespective of the vehicle speed at a point in time at which the possibility becomes equal to or larger than the possibility threshold value; and
perform, when the control start condition is satisfied, the pre-collision control when the permission information is stored, and not to perform, when the control start condition is satisfied, the pre-collision control when the permission information is not stored.

2. The driving assistance system according to claim 1, wherein:
the electronic control unit is further configured to:
delete, when the permission information is stored, the permission information when the obtained accelerating operation amount becomes less than a second operation amount threshold value, the second operation amount threshold value being equal to or smaller than the first operation amount threshold value.

3. The driving assistance system according to claim 2, wherein
the electronic control unit is configured to perform pre-collision control based on the vehicle speed at a point in time at which the accelerating operation amount becomes equal to or larger than a first operation amount threshold value.

4. A driving assistance method comprising the steps of:
detecting a target around a subject vehicle;
obtaining an accelerating operation amount corresponding to an operation amount of a driver of the subject vehicle;
detecting a vehicle speed, the vehicle speed being a speed of the subject vehicle; and
performing pre-collision control for avoiding a collision with the tartlet including the steps of:
performing a braking control to apply braking force to the vehicle during preliminary and main braking;
storing permission information when a permission condition that the obtained accelerating operation amount is equal to or larger than a first operation amount threshold value, and the detected vehicle speed is equal to or less than a speed threshold value, is established; and
determining, when a possibility of a collision between the target and the subject vehicle is equal to or higher than a possibility threshold value, that a control start condition is satisfied irrespective of the vehicle speed at a point in time at which the possibility becomes equal to or larger than the possibility threshold value; and
performing, when the control start condition is satisfied, the pre-collision control when the permission information is stored, and not to perform, when the control start condition is satisfied, the pre-collision control when the permission information is not stored.

5. The method according to claim 4, further comprising the steps of:
deleting, when the permission information is stored, the permission information when the obtained accelerating operation amount becomes less than a second operation amount threshold value, the second operation amount threshold value being equal to or smaller than the first operation amount threshold value.

6. The method according to claim 4, wherein the pre-collision control is performed based on the vehicle speed at a point in time at which the accelerating operation amount becomes equal to or larger than a first operation amount threshold value.

7. A non-transitory storage medium storing a program causing a driving assistance system to execute a driving assistance method comprising the steps of:
detecting a target, around a subject vehicle;
obtaining an accelerating operation amount corresponding to an operation amount of a driver of the subject vehicle;
detecting a vehicle speed, the vehicle speed being a speed of the subject vehicle; and
performing pre-collision control for avoiding a collision with the target further including the steps of:
performing a braking control to apply braking force to the subject vehicle during preliminary and main braking;
storing permission information when a permission condition that the obtained accelerating operation amount is equal to or larger than a first operation amount threshold value, and the detected vehicle speed is equal to or less than a speed threshold value, is established; and
determining, when a possibility of a collision between the target and the subject vehicle is equal to or higher than a possibility threshold value, that a control start condition is satisfied irrespective of the vehicle speed at a point in time at which the possibility becomes equal to or larger than the possibility threshold value; and
performing, when the control start condition is satisfied, the pre-collision control when the permission information is stored, and not to perform, when the control start condition is satisfied, the pre-collision control when the permission information is not stored.

8. The non-transitory storage medium storing according to claim 7, further comprising the steps of:
deleting, when the permission information is stored, the permission information when the obtained accelerating operation amount becomes less than a second operation amount threshold value, the second operation amount threshold value being equal to or smaller than the first operation amount threshold value.

9. The non-transitory storage medium storing according to claim 7, wherein the pre-collision control is performed based on the vehicle speed at a point in time at which the accelerating operation amount becomes equal to or larger than a first operation amount threshold value.

* * * * *